United States Patent Office 3,717,751
Patented Feb. 20, 1973

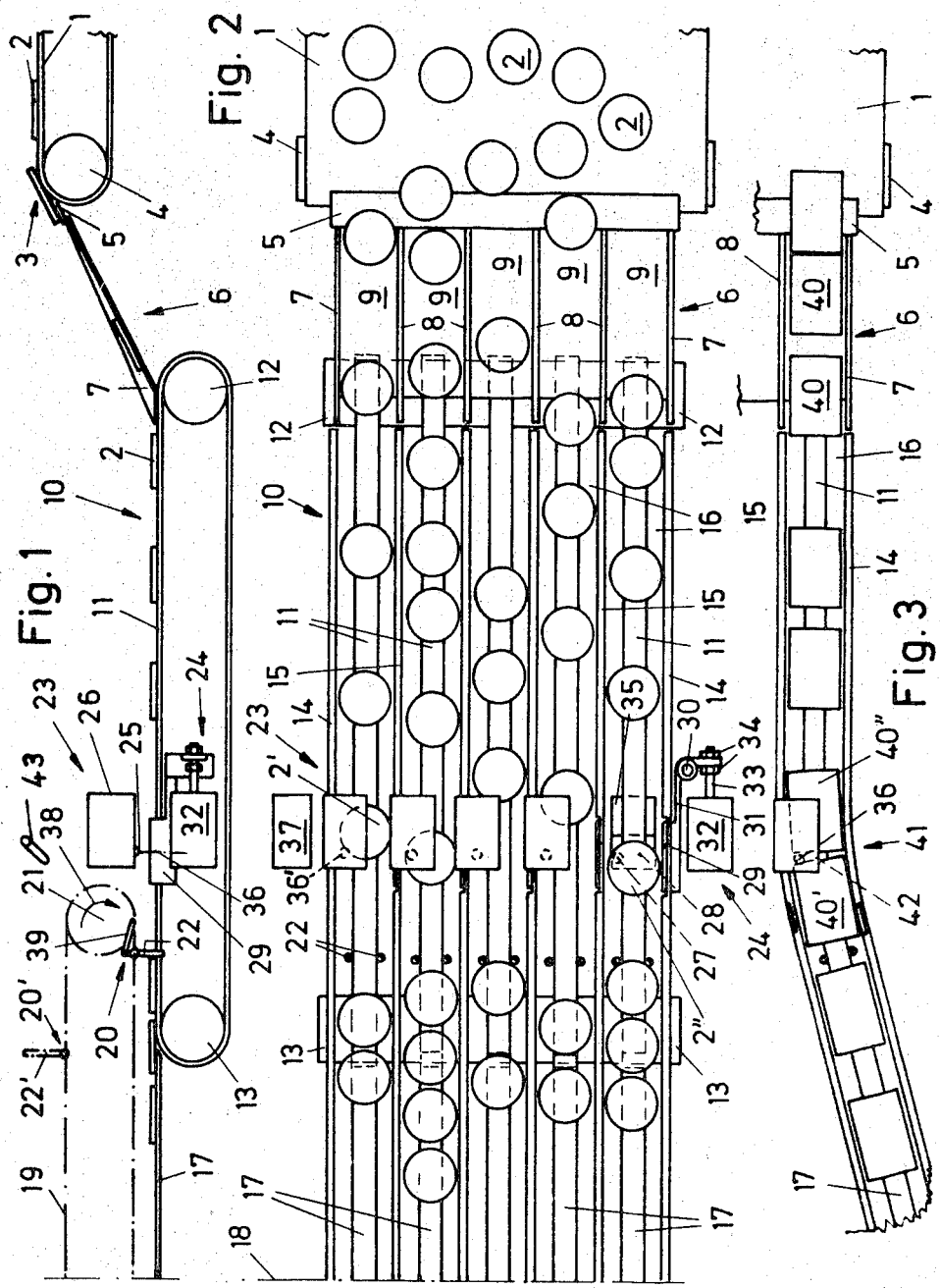

3,717,751
COUNTING DEVICE FOR REGULARLY SHAPED, PREFERABLY FLAT ARTICLES, FOR EXAMPLE, BISCUITS (OR COOKIES)
Rene Fluck, Neuhausen am Rheinfall, Switzerland, assignor to Schweizerische Industrie-Gesellschaft, Neuhausen am Rheinfall, Switzerland
Filed July 29, 1971, Ser. No. 167,360
Claims priority, application Switzerland, Aug. 3, 1970, 11,673/70
Int. Cl. G06m 7/00, 7/06
U.S. Cl. 235—92 PK                6 Claims

ABSTRACT OF THE DISCLOSURE

A counting device for uniformly shaped, preferably flat articles, such as biscuits, is provided with a wide conveyor belt to one end of which the articles to be counted are supplied in irregularly spaced manner.

These articles are supplied and distributed by the other end of said conveyor to a plurality of parallel counting channels, each of which receives a single row of articles and each of which is provided with a barrier past which said articles are caused to move and whose interruption and restoration serve for a counting of the articles. An adding device counts the articles which move past said barriers in each of said channels and after a predetermined number of articles has been counted, a braking device becomes effective and prevents any additional articles to be added to the group of articles already counted and to be found behind said barriers.

---

The invention relates to a counting device for regularly shaped, preferably flat articles, for example, biscuits, with a wide inlet-conveyor-belt, to which the articles are supplied in irregular manner spatially and as to time, in order to form at the outlet of the device, groups with predetermined number of articles. The groups formed, each of equal number of articles, may then be packed, preferably after being stacked one upon the other.

It is an object of the invention to provide a counting device which is provided with means for distributing the articles from the inlet conveyor belt to several parallel counting channels, in each of which a barrier is provided, whose interruption or restoring serves for the counting of the articles in the respective channel which pass the barrier. Furthermore, an adding device is provided, which determines the entire number of the articles passing the barrier, and after attainment of the predetermined number of articles of a group, controls the actuation of braking devices correlated with the channels, so that these braking devices prevent the feeding of additional articles to the group of articles formed behind the barriers, said group being fed to the outlet of the device.

A counting device of this type may be utilized for the feeding of a stacking device, such as that described in the Swiss patent specification.

The drawing illustrates diagrammatically and by way of example one preferred embodiment of the invention.

In the drawings:

FIG. 1 is a side view of a counting device for round biscuits,

FIG. 2 is a plan view of the device shown in FIG. 1, and

FIG. 3 is a plan view of a single channel of a counting device for rectangular biscuits.

Referring to the drawing, the counting device is provided with an endless conveyor belt, whose width approximately amounts to a multiple of the diameter of the round biscuits 2 to be conveyed by it.

Of the conveyor belt 1, only that part is shown which is guided over a reversing roller 4 provided at the discharge end 3 of the belt 1. The other reversing roller is located in the vicinity of a biscuit oven, in front of whose outlet the biscuits reach in spatially and timely irregular manner the receiving end of the conveyor 1. One or the other of the reversing rollers serves at the same time for the drive of the belt.

Beyond the discharge end 3 of the belt 1 there is provided a stationary flat transverse strip 5 inclined in longitudinal direction, which serves as stripper, in that it strips off the biscuits 2 from the belt 1 at the discharge end 3 and conveys them to a chute 6. The chute 6 is provided with two vertical low side walls 7 and with four vertical intermediary walls 8 parallel therewith, so that five channels 9, open at the top, are formed on the chute 6; the width of a channel 9 exceeds only slightly the diameter of a biscuit 2.

The chute 6 discharges the biscuits on a horizontal conveyor device 10, which consists mainly of five endless conveyor belts 11, which are guided over two reversing rollers 12 and 13, one of which also serves as a drive for the conveyor belts. Low side walls 14 or intermediary walls 15, which are omitted from FIG. 1, lie in the extensions of the walls 7 and 8, in order to limit laterally five channels 16 which are open at the top, and whose bottoms are formed between the rollers 12 and 13 by means of the belts 11. Beyond the rollers 13, to the contrary, the bottoms are formed by stationary slideways 17 of similar width as the belts 11. The channels 16 are designated as "counting channels," because the biscuits 2 conveyed along the same are being counted.

A dash-dotted transverse line 18 at the left hand end in FIG. 2 indicates the outlet of the counting device. The channels 16, however, go further and form the inlet part of a stacking device, which is described in the previously mentioned Swiss patent. Above the slideways 17 are located endless chains 19, which are equipped with actuators 20 and are guided at each end over chain wheels, of which only one wheel 21 is illustrated adjacent to the roller 13 in FIG. 1.

Each actuator 20 has two actuator pieces 22, which in their operative position extend downwardly at both sides of the conveyor belt 11 or the respective slideway 17, of the associated channel 16. Each channel 16 has associated therewith a light-barrier device 23 and a braking device 24. The light-barrier-device 23 is provided above the upper stretch of the belt 11 with a transmitter 26 equipped with a source of light 25, opposite to which lies below this stretch a receiver 28 provided with a photocell 27. FIG. 2 shows only one of the receivers 28, while the transmitter thereabove has been omitted for the sake of clarity of the drawing. Each braking device 24 comprises a brake shoe 29 connected with one arm of a bell crank 31 which is mounted for pivotal movement about a vertical pin 30 and has its other arm connected with the armature (not shown) of an electromagnet 32 by means of an at least partly threaded rod 33 and nuts 34, the brake shoe 29 being adapted for braking engagement with the respective conveyor belt 11 against the action of a spring (not shown). The transmitter 26, receiver 28 and electromagnet 32 are illustrated diagrammatically by means of rectangles.

Each receiver 28 contains an electronic counter 35 of known type, which upon consecutively occurring interruptions of the light-barrier 36 formed by the source of light 25 and the photocell 27, tilts consecutively from a first into a second tilting position. As each counter 35 accordingly counts the biscuits 2 moving continuously in longitudinal direction of the correlated channel 16, it is in the following designated in brief as "longitudinal counter." With all the longitudinal counters 35 there is also connected a common "transverse counter" 37, which periodically determines, in each case after a very short time interval, which longitudinal counters 35 have been actuated since the last control in response to an article, and continuously adds its determinations. When the transverse counter 37 determines that a predetermined number of biscuits—thirteen in the present case—has interrupted the light barriers 36, it releases a control-signal, through which the circuits of all the electromagnets 32 are restored. In addition, it returns to the zero position. If now a further biscuit interrupts one of the light barriers 36 and brings the same to respond, then through intervention of the transverse counter 37 which already grasps the same as part of the next group, the circuit of the magnet 32 of the corresponding brake 29 is closed.

In FIG. 2 is shown the point of time at which the light barrier indicated by 36' is interrupted in the first topmost in FIG. 2 channel 16 by the biscuit 2'. The electromagnet 20 energized by the respective control signal now swings the brake shoe 29 in clockwise direction as viewed in FIG. 2. Only a very small deflection is sufficient to clamp the biscuit 2' against the oppositely-lying wall 15 and to stop it. In the second and fifth channel, the described step has already been enacted earlier while the same is still to come in the channels third and fourth.

In order to insure a smooth course of operation—namely, a correct transfer of the counted groups of biscuits by the next series of actuators 20—the predetermined number of biscuits must have passed at a predetermined point of time the light-barrier 36. If this requirement is not fulfilled, in each case an emergency stop must be introduced. In this case, all brake shoes 29 are applied simultaneously and the transverse counter is set back to zero. Such an emergency stop is in each case released by the series of actuators 20, which are to take over the formation of the groups and convey them along the slideway 17. To this end, in the area of the chain wheel 21, a stationary key 43 is provided, which in each case is influenced by the actuators 20 moving continuously with the chain 19. If at this point of time, the counting operation is stopped, the influencing of the key 43 remains without effect. If this is not the case, the key 43, to the contrary, introduces the above mentioned stop. In addition, the key releases a signal which calls the attention of the personnel to the incomplete group. This signal may, however, also be utilized for the purpose of setting a slide-member (not shown) in operation, which automatically removes this group from the device.

The actuators 20 each engage a control part 39 which controls a pivotal movement of the actuator rods 22, which, however, is of importance solely with respect to the construction of the stacking device which follows upon the present counting device. The modus operandi of the control part 39 is therefore described in detail in the present application. For the purpose of the present counting device, it is sufficient if the actuators are provided with non-pivotal actuator rods projecting outwardly from the chain 19, as indicated in dash-dotted lines in FIG. 1 at 20' and 22'.

The electromagnets 32 remain in each case energized solely during a short interval of time; as soon as they are automatically deenergized, the braking devices 24, on account of the spring effect mentioned previously, return to their passage position, so that a new counting cycle commences. Of course, the toggle switches of the longitudinal counters 35 could move, instead of at the point of time of the interruption of the light barrier, at the point of time of their restoration to the second tilting position utilized for the transverse counting. The counting at the point of time of the interruption has, however, the advantage that the biscuits, for example, such as the biscuits 2" are conveyed still further, after they themselves have actuated the associated longitudinal counter 35, until another biscuit, in the present case, the biscuit 2' completes the counting cycle and the braking devices 24 are actuated. In this manner, the spacing between groups of biscuits following one another may be decreased.

With round biscuits 2, it is sufficient to provide the light barrier 36 in an edge zone of the channel 16, so that between two biscuits 2 directly following one another, a repeated closing of the light-barrier 36 is insured. A reliable counting of rectangular biscuits is, to the contrary, not possible with the device according to FIGS. 1 and 2, because when two rectangular biscuits are supplied one after the other—and for a braking device 24 disposed in braking position, this is not seldom the case—the light-barrier is not again closed between these two biscuits, so that the two biscuits would be counted as a single biscuit.

In order to count rectangular biscuits 40, FIG. 3 provides that each channel 16 is directly provided at the light-barrier 36, with a smooth curvature 41 or a slight kink. The change in direction of two biscuits 40' and 40" caused thereby produces a wedge-shaped gap 42 between the same, so that after passage of the biscuit 40', the light-barrier 36 is again restored with certainty before the arrival of the next biscuit 40".

It is to be noted that the braking devices 24 do not necessarily have to have electromagnets 32. It may for example also be possible to employ mechanical or hydraulic or pneumatically controlled or actuated braking devices. Also the light barriers 36 may be replaced by other types of barriers, for example, by capacitative barriers, in that the article 2 upon passage between the plates of a condenser changes its capacity; or magnetic barriers may be used in which a magnet switch is controlled by the approach or removal, respectively, of an article 2 consisting of magnetizable material.

The electronic adding device which determines the total number of articles, which pass along the channels 16 and the barriers 36, and which after attainment of the predetermined number of articles of the group to be formed, which as the case may be, actuates brake devices 24 provided with a common drive, must not necessarily consist of longitudinal counters for the partial addition of the articles in each channel, and of a transverse counter for the addition of the partial sums formed in the longitudinal counters.

What I claim is:

1. A transporting and counting device for uniformly shaped, frail and preferably flat articles, such as biscuits, which are to be supplied from a source with irregular output to a stacking or packaging means in groups which each contain a predetermined number of said articles, comprising:
(a) substantially horizontal and flat first conveyor means for moving said articles in spatially and timely disorganized order from said source in a direction toward said stacking means,
(b) a plurality of separate parallel counting channels having their inlet ends adjacent to the discharge end of said conveyor means and extending towards said stacking means, each of said channels being of a width sufficient to admit only one of said articles at a time,
(c) a plurality of second conveyor means individually associated with said channels and extending a portion of the length of said channels for moving the articles therein in the same direction as said first conveyor means,
(d) guide means at the receiving end of said second conveyor means adapted to permit gentle transfer of the articles from said first to said second conveyor means,
(e) means at the discharge end of said second conveyor means adapted to permit gentle transfer of the articles from said second conveyor means toward the stacking means, (f) a plurality of first counting means individually associated with said channels for counting the number of articles passing a barrier zone in each of said channels, (g) second counting means operatively connected with each of said first counting means and adapted to be actuated thereby when the total of articles passed through said barrier zone equals the number of articles to be included in each of said groups of articles, and (h) braking means associated with each of said first counting means and adapted upon operation thereof by an article in excess of the number of articles in one of said groups to prevent further movement of said excess articles past said barrier zone until the leading excess article in each of said channels has reached said barrier zone, whereby addition of further articles to a completed group of articles is prevented.

2. The device according to claim 1, in which each of said plurality of first counting means includes a light source and associated photocell device.

3. The device according to claim 1, in which said channels comprise stationary side walls and a bottom which at least in part is formed by a conveyor belt extending from the vicinity of the channel input end to beyond said barrier zone, the remainder of the bottom of each channel length comprising a stationary slideway.

4. The device according to claim 3, in which endless chain means are arranged at the outlet end portions of said conveyor belts and extend toward said stacking means, said chain means being provided with longitudinally spaced projections which extend into said channels and are adapted to engage articles therein to move them in the direction towards said stacking means.

5. The device according to claim 3, in which endless chain means are arranged at the outlet end portions of said conveyor belts and extend toward said stacking means, said chain means being provided with longitudinally spaced projections which extend into said channels and are adapted to engage articles therein to move them in the direction towards said stacking means, a control means being disposed in the path of movement of said projections and operatively connected with said second counting means and said braking means in such a manner as to cause application of said braking means and resetting to zero of said second counting means when engaged by one of said projections at a point of time when completion of one of said groups of articles has been interrupted beyond a predetermined length of time.

6. The device according to claim 2 for rectangular articles, in which each of said channels has a curvature in the region of said barrier zone, whereby between a pair of consecutive articles moving through said curved channel portion an opening is created for admitting light from said source of light to said photocell.

References Cited

UNITED STATES PATENTS

| | | | |
|---|---|---|---|
| 2,632,588 | 3/1953 | Hoar | 235—92 PK |
| 3,239,676 | 3/1966 | Pali | 198—40 X |
| 3,621,981 | 11/1971 | Nimmo et al. | 198—40 |
| 3,593,006 | 7/1971 | McGee et al. | 235—92 PK |

THOMAS A. ROBINSON, Primary Examiner

J. M. THESZ, JR., Assistant Examiner

U.S. Cl. X.R.

235—92 R, 92 V, 98 C; 198—40